May 20, 1924.
W. A. McCARRELL
1,494,794
CLUTCH FOR TRANSMISSION MECHANISMS
Filed Nov. 9, 1922    2 Sheets-Sheet 2
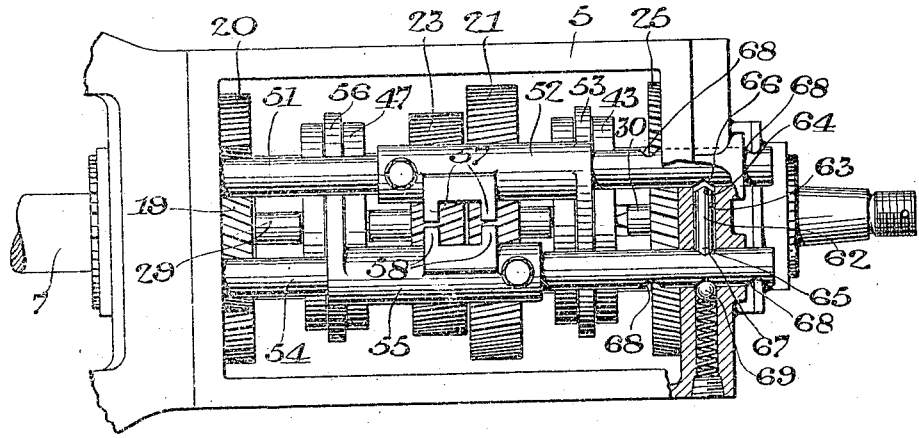
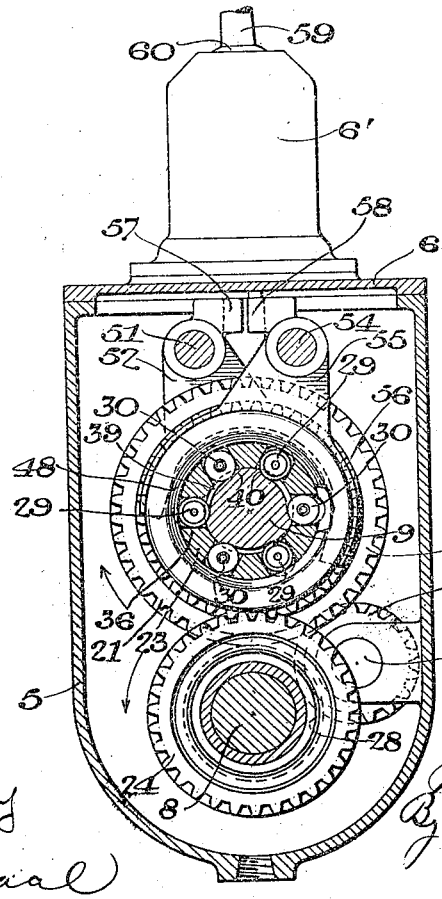
WITNESSES
INVENTOR
William A. McCarrell
ATTORNEY Patented May 20, 1924.

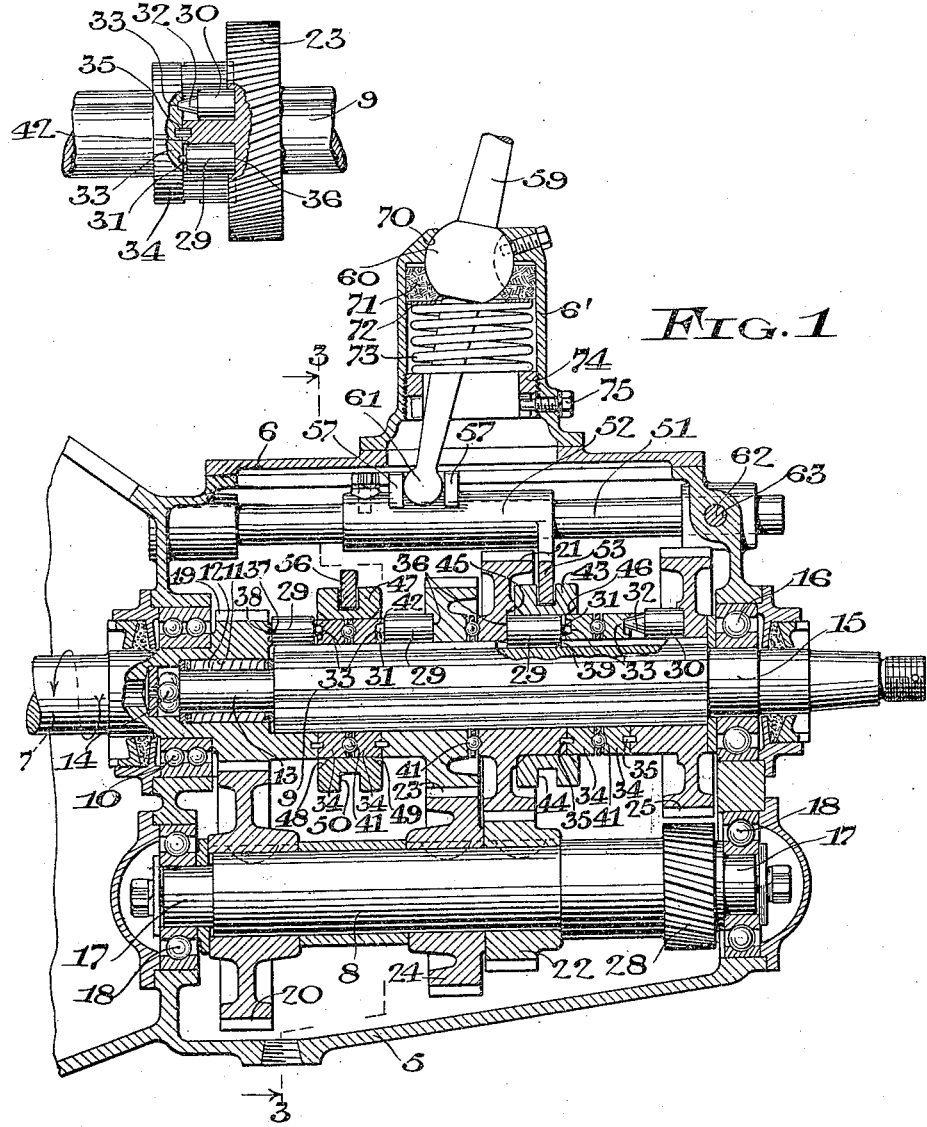

1,494,794

UNITED STATES PATENT OFFICE.

WILLIAM A. McCARRELL, OF MILWAUKEE, WISCONSIN.

CLUTCH FOR TRANSMISSION MECHANISMS.

Application filed November 9, 1922. Serial No. 599,840.

*To all whom it may concern:*

Be it known that I, WILLIAM A. McCARRELL, a citizen of the United States, and resident of Milwaukee, in the county of Milwaukee and State of Wisconsin, have invented new and useful Improvements in Clutches for Transmission Mechanisms, of which the following is a description, reference being had to the accompanying drawings, which are a part of this specification.

The invention relates to transmission mechanism of the type in which the gears are always in mesh, and is more particularly designed for use in motor-driven vehicles.

The object of the invention is to provide certain novel improvements in the transmission mechanism of my prior United States Letters Patent No. 1,380,917, dated June 7, 1921, by providing long and short clutch rollers whereby the long rollers may be first brought into driving position and thereafter the short rollers moved to driving position and serving to take up the back lash.

The invention further consists in the several features hereinafter set forth and more particularly defined by claims at the conclusion hereof.

In the drawings: Fig. 1 is a vertical sectional view through a transmission mechanism embodying the invention; Fig. 2 is a top view of the device with the cover and shifting lever removed, parts being shown in section; Fig. 3 is a section taken on the line 3—3 of Fig. 1 with the clutch thrown in for second speed; Fig. 4 is a view, partly in section, showing details of construction.

The numeral 5 designates the transmission casing, 6 the cover therefor and 7 the drive shaft, which may form a part of or be directly connected to the clutch shaft of the engine.

The transmission mechanism consists of an intermediate shaft 8 and a driven shaft 9, with gearing connections between the shafts 7 and 8 and 8 and 9 for first and second speed and reverse drive and a direct drive connection between the shafts 7 and 9 for high speed.

The end of the shaft 7 is journalled in a ball bearing 10 in the casing and is provided with a bore 11 having a roller bearing 12 mounted therein, in which the reduced end 13 of the shaft 9 is journalled, ball bearings 14 being mounted adjacent the end of the bore 11 and the end 13 to take up the end thrust. The other end 15 of the shaft 9 is journalled in a ball bearing 16 in casing 5. The shafts 9 and 7 are in line with each other. The ends 17 of the shaft 8 are journalled in bearings 18 in the ends of the transmission casing 5.

A gear 19 is formed on the end of the shaft 7 and meshes with a gear 20 keyed to the shaft 8. A gear 21 is loosely mounted on the shaft 9 and meshes with a gear 22 keyed to the shaft 8. A gear 23 is loosely mounted on the shaft 9 and meshes with a gear 24 keyed to the shaft 8. A gear 25, loosely mounted on the shaft 9, meshes with an idler gear 26 on a stud shaft 27, which idler gear meshes with a gear 28 keyed to the shaft 8. The gears previously mentioned are all spiral gears but other forms of gears may be used with the clutch construction hereinafter described.

For the first speed the drive is through the gears 19 and 20, shaft 8 and gears 22 and 21 to the shaft 9; for second speed through gears 19 and 20, shaft 8 and gears 24 and 23 to shaft 9; for reverse the drive is through gears 19 and 20, shaft 8, gears 28, 26 and 25, and for high speed the drive is direct from the shaft 7 to the shaft 9, the driving connections being effected as hereinafter described.

The gears 21, 23, 25 and the shaft 7 are adapted to be selectively locked in driving relation with the shaft 9 by means of what may be termed "roller key clutches." Each of these clutches embodies a plurality of radially disposed rollers 29 and 30, the rollers 29 having short pin ends 31 and the rollers 30 having long pin ends 32, which pin ends are mounted in radially extending sets of guide grooves or recesses 33 in a collar 34 disposed adjacent the gear to be locked, each of the collars 34 being respectively secured to the gear with which it cooperates by means of pins 35. The rollers 29 and 30 for the gears 21, 23 and 25 have flat ends slidably mounted in radially disposed guide recesses 36 in the hubs of said gears while the rollers 29 and 30 for the gear 19 have pin ends 37 slidably mounted in radially disposed guide recesses 38 in the hub of said gear 19. The rollers 29 with the short pin ends 31 are arranged about the shaft 9 to alternate with the rollers 30 with the long pin ends 32, as shown in Fig.

3. For the purpose of locking the gears to the shaft 9 by means of the rollers 29 and 30, each set of these rollers, positioned between the hub of the gear and the collar connected thereto, is adapted to be moved in radial recesses, above described, into splines 39 in the shaft 9 when said splines are in line with the guiding slots or recesses for the rollers. In the present instance each spline 39 takes care of a pair of rollers, one long and one short-ended roller, and said recesses have bevelled sides 40 so that when the gear is loose on the shaft the rollers associated with it will be prevented from locking said gear to said shaft by the cam action of the inclined sides 40 upon the rollers. This cam action is facilitated by the fact that the depth of the recesses 39 is less than the radius of the rollers. Disengagement of the rollers with the shaft is also effected by the action of centrifugal force.

Between each set of collars 34 and between the gears 21 and 23 there are anti-friction bearings 41, here shown as of the ball type, to efficiently handle the thrusts of the spiral gears.

Portions 42 of the rollers adjacent the pin ends are rounded or bevelled so as to permit a clutch shifting member to be moved laterally toward the respective gear to be locked in engagement with the shaft and thereby force the long rollers and then the short rollers carried by this gear into the recesses 39 in the shaft and allow said member to be moved over the rollers to maintain them in locking engagement with the shaft. In the present instance as the recesses 39 are longer than the diameters of the rollers the long rollers are easily slipped into driving engagement with the shaft and directly thereafter the short rollers are moved to operative position and take up the back lash of the connection.

For first and reverse speed a clutch-shifting member 43 is slidably mounted upon the collars 34 on the shaft 9 between the hubs for the gears 21 and 25. This member 43 is in the form of a collar provided with an annular groove 44 and having an annular beveled portion 45 adjacent the gear 21 and an annular beveled portion 46 adjacent the gear 25. By shifting the member 43 toward the gear 21 the beveled portion 45 will strike the beveled ends of the clutch rollers for this gear, force them into the recesses in the shaft and hold them therein, as shown in Fig. 1, so that the gear 21 will be drivingly connected with the shaft 9 to effect first speed, as previously pointed out, and when the shifting member 43 is moved toward the gear 25 to dispose and maintain its clutch rollers in splined engagement with the recesses in the shaft 9, the shaft 9 will be reversely driven from the shaft 7 through the gear connections previously described.

Another clutch shifting member 47 is slidably mounted on the collars 34 between the gears 23 and 19 and is provided with annular bevels 48 and 49 and an annular groove 50. When the member 47 is shifted towards the gear 19 the beveled portion 48 will force the rollers adjacent the gear 19 into the recesses in the shaft 9 and hold them therein to directly lock the shafts 7 and 9 to each other for high speed, and when the member 47 is shifted to bring the beveled portion 49 into engagement with the rollers for the gear 23, said rollers will be moved into the recesses 39 in the shaft 9 and be secured therein, in which instance the shaft 9 will be driven at second speed from the shaft 7 by means of the gearing connection previously described.

The clutch shifting member 43 is shifted by means of a shifting shaft 51 carrying a forked member 52, the ends 53 of which are disposed in the annular recess 44. The clutch member 47 is shifted by means of a shifting shaft 54 carrying a forked member 55, the ends 56 of which are disposed in the annular groove 50. The forked member 52 has inwardly projecting spaced lugs 57 and the forked member 55 has similar lugs 58.

Selective actuation of the clutches is effected by a shifting lever 59 which has a ball and socket bearing connection 60 with the top 6' of the casing and has an end 61 movable into engagement with the lugs 57 or with the lugs 58. When the end 61 is moved into engagement with the lugs 57 and is oscillated so as to move the shaft 51 toward the left from neutral position, as shown in Fig. 1, the first speed gear set will be thrown in, and when shifted toward the right from neutral position the reverse gearing connection will be made, due to the shifting of the collar 43, as previously described. When the end 61 is moved over to cooperate with the projections 58 and the shaft 54 is moved toward the right from neutral position, the second speed gearing will be thrown in, and when said shaft 54 is shifted toward the left from neutral position the high speed or direct drive connection will be made by the shifting of the collar 47. In neutral position the collars 43 and 47 surround the collars 34, as shown at the left in Fig. 1.

In order to prevent the throwing in of more than one clutch at a time, movement of only one of the shifting shafts is permitted at a time by means of a shiftable locking pin 62, which is slidably mounted in a bore 63 in the casing and has beveled ends 64 and 65 engageable respectively with notches 66 and 67 in the shafts 51 and 54. The length of this pin is such as to permit the movement of one of the shifting shafts but does not permit movement of both of the shifting shafts at one time, and when one of the shafts is moved from its normal position the cam action between the end of the pin and the notch in the shaft will force said pin into locking engagement with the other shiftable shaft.

In order to releasably secure the shafts 51 and 54 in their different positions, I provide a series of notches 68 in each of said shafts adapted to be engaged by a spring-pressed ball 69 or other suitable detent, as shown in Fig. 2 in connection with the shaft 54.

The leak-proof ball and socket construction 60 comprises a conical seat 70 in the head of a sectional part 6' of the cover 6, a washer 71 of felt or other suitable material held by means of a metal plate 72 and a spring 73 adjacent the spherical curved part of the lever 61, said spring being held at its lower end by means of a ring 74 having threaded engagement with the part 6' and held against rotation by a set screw 75.

What I claim as my invention is:

1. In a transmission mechanism, the combination of a shaft provided with radially disposed recesses, a member loosely mounted thereon, a roller key clutch for drivingly connecting said member with said shaft comprising a plurality of rollers of different effective length operatively connected with said member, and means for moving first the longer rollers and then the shorter rollers into said recesses and retaining them therein.

2. In a transmission mechanism, the combination of a shaft provided with radially disposed recesses, a member loosely mounted thereon and provided with radially disposed guideways, a plurality of rollers in said guideways, said rollers having alternately long and short end portions, and means for moving said rollers partly out of said guides and into said recesses and retaining them therein to lock said member in driving engagement with said shaft.

3. In a transmission mechanism, the combination of a shaft provided with splines, a gear loosely mounted thereon, a roller key clutch for drivingly connecting said gear with said shaft comprising a pair of rollers disposable in each of said splines, one roller being a driving roller and the other being a backlash take-up roller, said rollers being operatively connected to said gear, and means for first moving the driving rollers and then the backlash take-up rollers into said splines and retaining them therein.

4. In a transmission mechanism, the combination of a shaft provided with radially disposed recesses, a member loosely mounted thereon and provided with radially disposed guideways, a plurality of rollers in said guideways, a shiftable collar mounted to engage said rollers and move them into said recesses and retain them therein to lock said member in driving engagement with said shaft, said rollers having alternately long and short pin-end portions whereby the rollers with the short pins are first moved to driving position and then the rollers with the longer pin-end portions are moved to driving position as said collar is moved toward said member.

5. In a transmission mechanism, the combination of a shaft provided with splines, a gear loosely mounted on said shaft, a clutch for connecting said gear with said shaft comprising a pair of clutch elements disposable in each of said splines, one of said elements being a driving element and the other a back-lash take-up element, said elements being operatively connected to said gear, and means for successively moving the driving elements and back-lash take-up elements into said splines and retaining them therein.

In testimony whereof I affix my signature.

WILLIAM A. McCARRELL.